(12) United States Patent
Suzuki et al.

(10) Patent No.: US 8,030,412 B2
(45) Date of Patent: Oct. 4, 2011

(54) ACTIVE-ENERGY-RAY-CURABLE COATING COMPOSITION, CURED PRODUCT THEREOF, AND NOVEL CURABLE RESIN

(75) Inventors: Hideya Suzuki, Ichihara (JP); Shin Sasamoto, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 12/990,432

(22) PCT Filed: Apr. 15, 2009

(86) PCT No.: PCT/JP2009/057553
§ 371 (c)(1),
(2), (4) Date: Jan. 20, 2011

(87) PCT Pub. No.: WO2009/133770
PCT Pub. Date: Nov. 5, 2009

(65) Prior Publication Data
US 2011/0118405 A1    May 19, 2011

(30) Foreign Application Priority Data
Apr. 30, 2008 (JP) ................................. 2008-118468

(51) Int. Cl.
*C08F 114/18* (2006.01)
(52) U.S. Cl. ..................... 525/326.2; 525/276; 525/374; 525/384; 525/385; 525/386
(58) Field of Classification Search .................. 525/276, 525/326.2, 374, 384, 385, 386
See application file for complete search history.

(56) References Cited

U.S. PATENT DOCUMENTS

| | | | | | |
|---|---|---|---|---|---|
| 3,810,874 | A | * | 5/1974 | Mitsch et al. | 528/70 |
| 4,094,911 | A | * | 6/1978 | Mitsch et al. | 568/615 |
| 4,506,054 | A | * | 3/1985 | Vasta | 524/413 |
| 7,381,774 | B2 | * | 6/2008 | Bish et al. | 525/326.2 |
| 7,772,327 | B2 | * | 8/2010 | Kawasaki et al. | 525/326.2 |
| 2004/0236028 | A1 | * | 11/2004 | Hung et al. | 525/326.2 |
| 2005/0282955 | A1 | * | 12/2005 | Apostolo et al. | 524/544 |
| 2009/0306296 | A1 | * | 12/2009 | Nanba et al. | 525/200 |

FOREIGN PATENT DOCUMENTS

| | | |
|---|---|---|
| JP | 01-113416 A | 5/1989 |
| JP | 2931599 B2 | 12/1990 |
| JP | 4068786 B2 | 10/2001 |
| JP | 2005-179613 A | 7/2005 |
| JP | 3963169 B2 | 8/2007 |
| JP | 2007-246696 A | 9/2007 |
| JP | 2007-537059 A | 12/2007 |

OTHER PUBLICATIONS

International Search Report dated Jun. 23, 2009, issued for PCT/JP2009/057553.

* cited by examiner

*Primary Examiner* — Bernard Lipman
(74) *Attorney, Agent, or Firm* — Edwards Angell Palmer & Dodge LLP

(57) ABSTRACT

The present invention relates to an active-energy-ray-curable coating composition containing, as essential components, a radical-polymerizable resin (I) containing a polymer structure ($\alpha$) of a radical-polymerizable unsaturated monomer and a poly(perfluoroalkylene ether) chain ($\beta$), and having a resin structure in which a plurality of the polymer structures ($\alpha$) are linked to each other with the poly(perfluoroalkylene ether) chain ($\beta$) therebetween and the polymer structures ($\alpha$) each have a radical-polymerizable unsaturated group at a side chain thereof; and a polymerization initiator (II).

The active-energy-ray-curable coating composition can be used as a coating material that imparts surface properties such as stain-proof properties.

10 Claims, 3 Drawing Sheets

[Fig. 1]
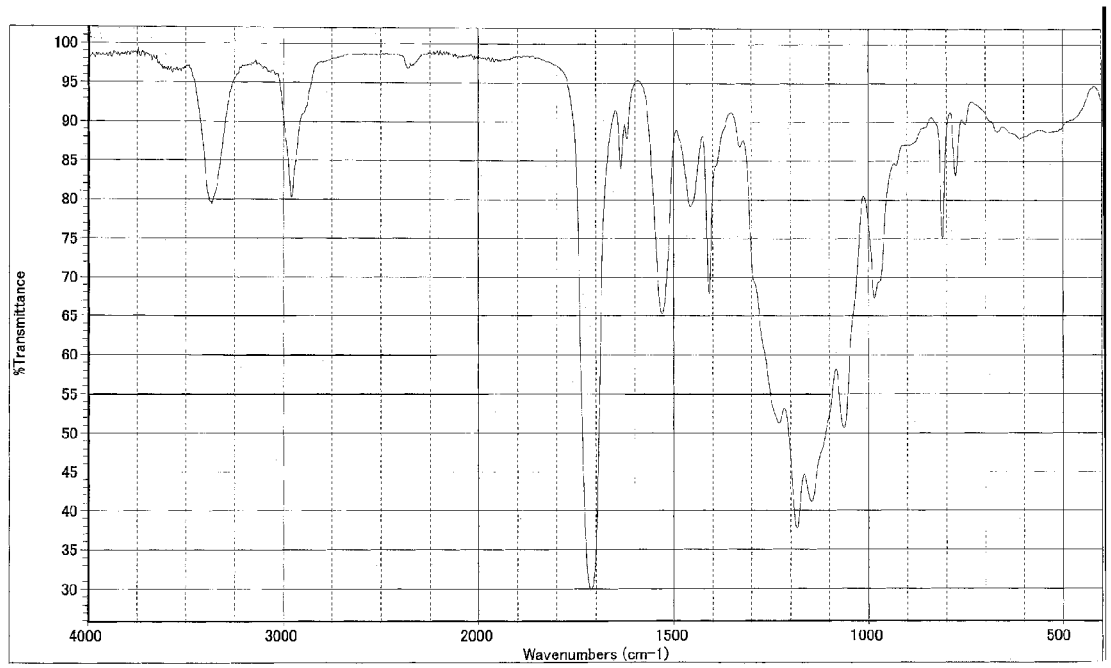

[Fig. 2]
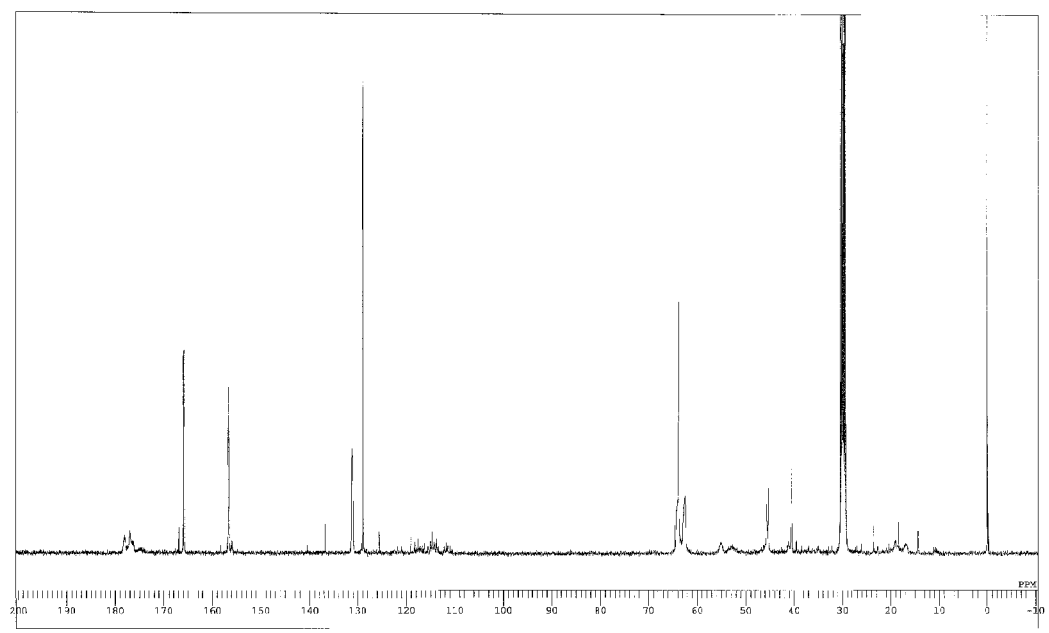

[Fig. 3]
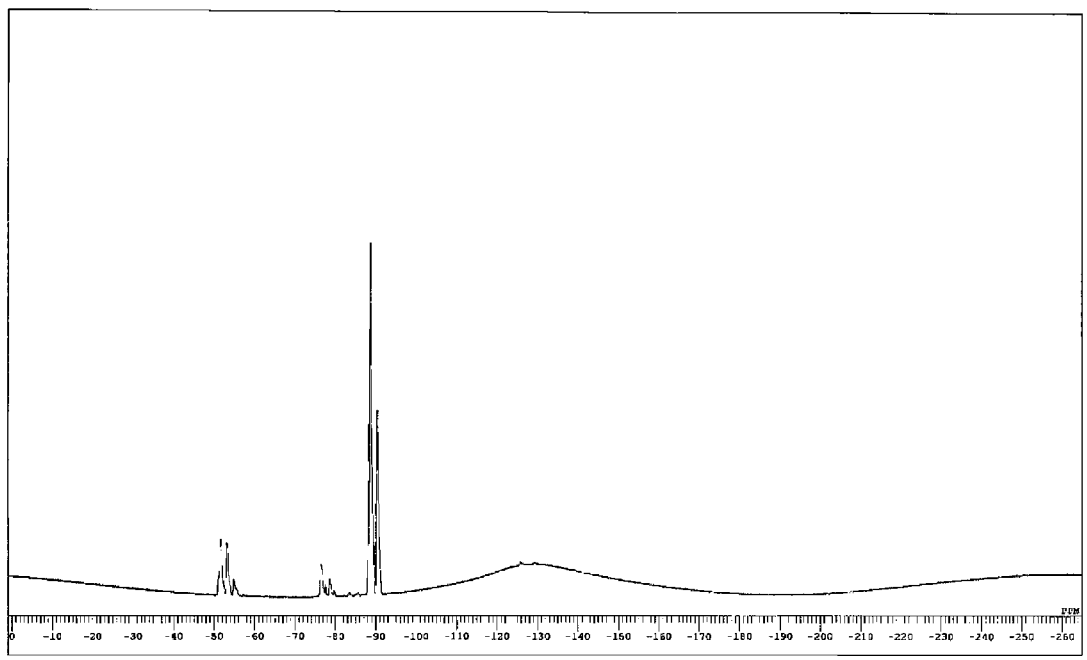

ACTIVE-ENERGY-RAY-CURABLE COATING COMPOSITION, CURED PRODUCT THEREOF, AND NOVEL CURABLE RESIN

TECHNICAL FIELD

The present invention relates to an active-energy-ray-curable coating composition that is excellent in terms of stain-proof properties of a surface of a cured coating film, a cured product thereof, and a novel curable resin that can be cured by active energy rays such as ultraviolet rays and that is suitable for applications such as a fluorine-containing surfactant, a fluorine-containing surface modifier, and a fluorine-containing ultraviolet curable resin.

BACKGROUND ART

Fluorine-containing surfactants or fluorine-containing surface modifiers are widely used as various coating materials, surface modifiers, and the like from the standpoint that they are excellent in terms of leveling property, wettability, permeability, anti-blocking property, slidability, water/oil repellency, stain-proof property etc.

Cured coating films obtained by applying and curing an ultraviolet-curable coating containing such a fluorine-containing surfactant or a fluorine-containing surface modifier (hereinafter abbreviated as "fluorine-containing surfactant or the like") exhibit excellent surface properties. On the other hand, because of heating, humidity, exposure to a chemical such as an acid or an alkali, washing for removing stains, or the like, a part of the fluorine-containing surfactant or the like is easily detached or volatilized from the surfaces of the cured coating films, resulting in problems such as contamination in production lines and deterioration in the stain-proof properties of the surfaces of the coating films.

For example, in the field of coating materials for coating a protective film such as a triacetyl cellulose (TAC) film used in polarizers for liquid crystal displays, in order to provide a film surface with stain-proof properties for fingerprints and stains, a surface of the protective film is coated with an ultraviolet-curable hard-coating material containing a fluorine-containing surfactant or the like. However, in order to improve adhesiveness, a saponification treatment (strong alkali treatment) is performed on a surface of the protective film, the surface being opposite to the surface having the hard-coating material thereon. In this step, contact between the hard-coated surface and a saponification solution is inevitable, and thus the fluorine-containing surfactant or the like present in a surface layer is decomposed by a strong alkali, resulting in deterioration in the stain-proof properties.

Furthermore, as a coating/ink or a black resist for a black matrix or coloring materials for forming color pixels of three colors of red, green, and blue, the black matrix and the coloring materials being used for a color filter for liquid crystal displays, ultraviolet-curable resin compositions containing a fluorine-containing surfactant or the like are used in order to improve liquid repellency after the formation of a coating film. However, in particular, when the black matrix is formed by patterning a resist, after curing by ultraviolet irradiation, a heat-setting treatment is conducted under a high-temperature condition, for example, at 230° C. for 30 minutes. Accordingly, a part of a component of the fluorine-containing surfactant or the like is volatilized from the surface. As a result, the liquid repellency of the surface decreases, and a problem such as contamination of other portions and production lines due to the volatilized substances occurs.

Known techniques for preventing such a decrease in the function of a coating surface include the use of a polymerization-type fluorine-containing surfactant containing an unsaturated group, the surfactant being obtained by copolymerizing a fluorinated alkyl group-containing monoacrylate with an active hydrogen-containing acryl monomer, and then polymerizing an isocyanate group-containing acryl monomer with the resulting polymer (refer to, for example, Patent Document 1), and the use of a perfluoropolyether group-containing urethane acrylate as a fluorine-containing surfactant, the perfluoropolyether group-containing urethane acrylate being obtained by allowing a hydroxyl group-containing perfluoropolyether and a hydroxyl group-containing acryl monomer to react with a triisocyanate compound which is a trimer of a diisocyanate (refer to, for example, Patent Document 2).

However, in the polymerization-type fluorine-containing surfactant described in Patent Document 1, since a fluorinated alkyl group is bonded to a polymer chain in the form of a pendant, decomposition and detachment are still easily caused by the above-mentioned strong alkali treatment, and the stain-proof properties tend to deteriorate. In particular, once stains adhere, the stains cannot be easily removed by wiping, and it is very difficult to remove such stains. In particular, when a coating film is cured by irradiation of ultraviolet rays in air, such a polymerization-type fluorine-containing surfactant tends to be subjected to an effect of curing inhibition caused by oxygen because the surfactant is present on a surface of the coating film. In addition, in the above-mentioned applications, the irradiation time of ultraviolet rays tends to be decreased in order to increase the production rate. Therefore, it is very difficult to allow the polymerization-type fluorine-containing surfactant to sufficiently react with a coating film-forming component, the polymerization-type fluorine-containing surfactant remains on the surface of the coating film in an unreacted state, and thus the surfactant is easily removed. As a result, the stain-proof properties tend to decrease, resulting in a serious problem that, once stains adhere, the stains are not easily removed. On the other hand, in the perfluoropolyether group-containing urethane acrylate described in Patent Document 2, it is difficult to allow the hydroxyl group-containing perfluoropolyether and the hydroxyl group-containing acryl monomer to react with the trifunctional isocyanate compound in an appropriate ratio. Consequently, a compound having only a perfluoropolyether and a compound having only an acryloyl group are produced in a large amount. Therefore, it is difficult to industrially produce the perfluoropolyether group-containing urethane acrylate.

[Patent Document 1] Japanese Unexamined Patent Application Publication No. 2007-246696
[Patent Document 2] Japanese Patent No. 3963169

DISCLOSURE OF INVENTION

Problems to be Solved by the Invention

Accordingly, an object to be achieved by the present invention is to provide an active-energy-ray-curable coating composition in which, after an active-energy-ray-curable coating composition containing a fluorine-containing surfactant or the like is applied and cured, volatilization and detachment of the fluorine-containing surfactant or the like or a decomposition product thereof from a surface of the resulting coating film can be satisfactorily prevented, and which has markedly improved surface properties such as stain-proof properties, a cured product thereof, and a novel curable resin that can impart excellent surface properties to a coating film.

Means for Solving the Problems

The inventors of the present invention conducted intensive studies in order to achieve the above object. As a result, it was found that surface properties of a coating film, which are typified by stain-proof properties, are markedly improved by using, as a fluorine-containing surfactant, a fluorine-containing surface modifier, or a coating film-forming component, a radical-polymerizable resin having a structure in which a plurality of polymer structures of a radical-polymerizable unsaturated monomer are linked to each other with a poly (perfluoroalkylene ether) chain therebetween and in which a polymerizable unsaturated double bond is introduced into the polymer structure. This finding resulted in completion of the present invention.

Specifically, the present invention relates to an active-energy-ray-curable coating composition containing, as essential components, a radical-polymerizable resin (I) containing a polymer structure ($\alpha$) of a radical-polymerizable unsaturated monomer and a poly(perfluoroalkylene ether) chain ($\beta$), and having a resin structure in which a plurality of the polymer structures ($\alpha$) are linked to each other with the poly (perfluoroalkylene ether) chain ($\beta$) therebetween and the polymer structures ($\alpha$) each have a radical-polymerizable unsaturated group at a side chain thereof; and a polymerization initiator (II).

The present invention further relates to a cured product obtained by applying the active-energy-ray-curable coating composition onto a base, and curing the coating composition by irradiation of active energy rays.

The present invention further relates to a novel curable resin containing a polymer structure ($\alpha$) of a radical-polymerizable unsaturated monomer and a structure ($\beta$) containing a poly(perfluoroalkylene ether) chain, wherein the curable resin has a resin structure in which a plurality of the polymer structures ($\alpha$) are linked to each other with the structural site ($\beta$) therebetween and the polymer structures ($\alpha$) each have a radical-polymerizable unsaturated group at a side chain thereof.

Advantages

The present invention can provide an active-energy-ray-curable coating composition in which, after an active-energy-ray-curable composition containing a fluorine-containing surfactant or the like is applied and cured, volatilization and detachment of the fluorine-containing surfactant or the like or a decomposition product thereof from a surface of the resulting coating film can be satisfactorily prevented, and which has markedly improved surface properties such as stain-proof properties; a cured product thereof; and a novel curable resin that can impart excellent surface properties to a coating film.

BEST MODES FOR CARRYING OUT THE INVENTION

A radical-polymerizable resin (I) used in the present invention is a novel curable resin containing a polymer structure ($\alpha$) of a radical-polymerizable unsaturated monomer and a poly(perfluoroalkylene ether) chain ($\beta$), and having a resin structure in which a plurality of the polymer structures ($\alpha$) are linked to each other with the poly(perfluoroalkylene ether) chain ($\beta$) therebetween and the polymer structures ($\alpha$) each have a radical-polymerizable unsaturated group at a side chain thereof.

Here, examples of the radical-polymerizable unsaturated monomer constituting the polymer structure ($\alpha$) include acrylic monomers, aromatic vinyl monomers, vinyl ester monomers, and maleimide monomers, and the polymer structure ($\alpha$) is a structural site of a straight-chain structure which is a homopolymer or a copolymer of these monomers. In the present invention, it is necessary to introduce a radical-polymerizable unsaturated group into a side chain of the polymer structure ($\alpha$), and thus, a radical-polymerizable unsaturated monomer (B) having an ion-reactive functional group (b1) is used as a part of or the entire monomer component. Accordingly, the polymer structure ($\alpha$) is a homopolymer structure of the radical-polymerizable unsaturated monomer (B) or a copolymer structure of the radical-polymerizable unsaturated monomer (B) and other radical-polymerizable unsaturated monomers. Furthermore, in the present invention, as described below, when the polymer structure ($\alpha$) is produced by polymerizing the radical-polymerizable unsaturated monomer, it is preferable to copolymerize a compound (A) having a structural site having a poly(perfluoroalkylene ether) chain and radical-polymerizable unsaturated groups at both ends of the chain with the radical-polymerizable unsaturated monomer. In this case, the polymer structure ($\alpha$) also contains the structural site derived from the compound (A).

Here, examples of the ion-reactive functional group (b1) present in the radical-polymerizable unsaturated monomer (B) include a hydroxyl group, an isocyanate group, a glycidyl group, and a carboxyl group. Examples of the radical-polymerizable unsaturated monomer (B) include hydroxyl group-containing unsaturated monomers such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth) acrylamide, glycerol mono(meth)acrylate, polyethylene glycol mono(meth)acrylate, polypropylene glycol mono(meth) acrylate, 2-hydroxy-3-phenoxypropyl (meth)acrylate, 2-(meth)acryloyloxyethyl-2-hydroxyethyl phthalate, and terminal hydroxyl group-containing lactone-modified (meth) acrylate; isocyanate group-containing unsaturated monomers such as 2-(meth)acryloyloxyethyl isocyanate and 2-(2-(meth) acryloyloxyethoxy)ethyl isocyanate; glycidyl group-containing unsaturated monomers such as glycidyl methacrylate and 4-hydroxybutyl acrylate glycidyl ether; and carboxyl group-containing unsaturated monomers such as (meth)acrylic acid, 2-(meth)acryloyloxyethyl succinic acid, 2-(meth)acryloyloxyethyl phthalic acid, and itaconic acid.

Examples of the other radical-polymerizable unsaturated monomers copolymerizable with the radical-polymerizable unsaturated monomer (B) include methacrylic acid esters such as methyl methacrylate, ethyl methacrylate, n-propyl methacrylate, n-butyl methacrylate, isobutyl methacrylate, n-pentyl methacrylate, n-hexyl methacrylate, n-heptyl methacrylate, n-octyl methacrylate, 2-ethylhexyl methacrylate, nonyl methacrylate, decyl methacrylate, dodecyl methacrylate, cyclohexyl methacrylate, and isobornyl methacrylate; acrylic acid esters such as methyl acrylate, ethyl acrylate, n-propyl acrylate, n-butyl acrylate, isobutyl acrylate, n-pentyl acrylate, n-hexyl acrylate, n-heptyl acrylate, n-octyl acrylate, 2-ethylhexyl acrylate, nonyl acrylate, decyl acrylate, dodecyl acrylate, cyclohexyl acrylate, and isobornyl acrylate; and aromatic vinyls such as styrene, $\alpha$-methylstyrene, p-methylstyrene, and p-methoxystyrene.

Examples of the other radical-polymerizable unsaturated monomers further include maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

Next, specific examples of the poly(perfluoroalkylene ether) chain (β) include chains having a structure in which a divalent fluorocarbon group having 1 to 3 carbon atoms and an oxygen atom are alternately bonded to each other. The divalent fluorocarbon groups each having 1 to 3 carbon atoms may include one type of group or two or more types of groups. Specific examples of the divalent fluorocarbon group having 1 to 3 carbon atoms include groups represented by structural formula I below.

[Chem. 1]

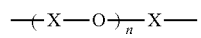
1

(In structural formula 1, X is selected from structural formulae a to d below, and all Xs in structural formula 1 may have the same structure or Xs may have a plurality of structures that are present at random or in the form of blocks. In addition, n is a number of 1 or more representing a repeating unit.)

[Chem. 2]

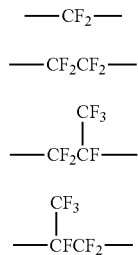

Among these, from the standpoint that, in particular, a property of allowing stains on a surface of a coating film to be easily wiped off becomes satisfactory and that a coating film having excellent stain-proof properties is obtained, chains in which a perfluoromethylene structure represented by structural formula a above and a perfluoroethylene structure represented by structural formula b above coexist are particularly preferable. Here, from the standpoint of stain-proof properties, a presence ratio of the perfluoromethylene structure represented by structural formula a above to the perfluoroethylene structure represented by structural formula b above is preferably in the range of 1/4 to 4/1 in terms of molar ratio (structure a/structure b), and the value of n in structural formula 1 above is preferably in the range of 3 to 40, and particularly preferably in the range of 6 to 30.

In the poly(perfluoroalkylene ether) chain (β), from the standpoint that an excellent property of allowing stains to be easily wiped off and slidability can be realized and that the solubility to fluorine-free curable resin compositions can be easily improved, the total number of fluorine atoms contained in one poly(perfluoroalkylene ether) chain is preferably in the range of 18 to 200, and particularly preferably in the range of 25 to 80.

Here, in order to bond each end of the poly(perfluoroalkylene ether) chain (β) to the polymer structure (α) of a radical-polymerizable unsaturated monomer, the following methods may be employed. A compound (A) having a structural site having a poly(perfluoroalkylene ether) chain and radical-polymerizable unsaturated groups at both ends of the chain may be copolymerized with a radical-polymerizable unsaturated monomer containing, as an essential monomer component, a radical-polymerizable unsaturated monomer (B) having an ion-reactive functional group (b1). Alternatively, a radical-polymerizable unsaturated monomer containing, as an essential monomer component, a radical-polymerizable unsaturated monomer (B) having an ion-reactive functional group (b1) may be polymerized to produce a polymer structure (α), and the polymer structure (α) may then be allowed to react with a compound (A') having a poly(perfluoroalkylene ether) chain and functional groups (a1) at both ends of the chain, the functional groups (a1) each having reactivity with the ion-reactive functional group (b1).

Next, the radical-polymerizable unsaturated group present at a side chain of the polymer structure (α) is an ethylenic double bond that exhibits curability by irradiation of active energy rays. Specific examples thereof include groups represented by structural formulae U-1 to U-3 below.

[Chem. 3]

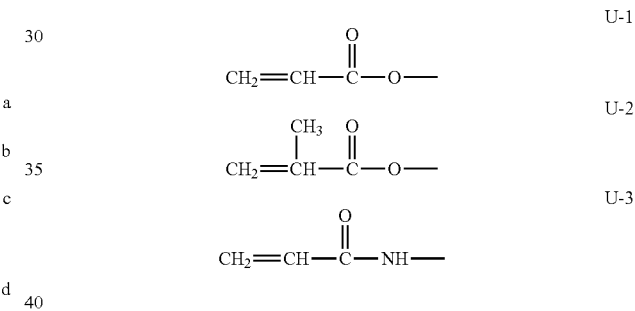

In order to introduce the radical-polymerizable unsaturated group into the side chain of the polymer structure (α), for example, after the polymer structure (α) is produced, a compound (C) having a radical-polymerizable unsaturated group and a functional group (c1) having reactivity with the ion-reactive functional group (b1) is allowed to react with the ion-reactive functional group (b1) present at the side chain of the polymer structure (α).

Accordingly, from the standpoint of the ease of the industrial production, specifically, the radical-polymerizable resin (I) is preferably a radical-polymerizable resin (hereinafter, abbreviated as "radical-polymerizable resin (I-1)") obtained by allowing a compound (C) having a radical-polymerizable unsaturated group and a functional group (c1) having reactivity with an ion-reactive functional group (b1) to react with a polymer (P1) obtained by copolymerizing, as essential monomer components, a compound (A) having a structural site having a poly(perfluoroalkylene ether) chain and radical-polymerizable unsaturated groups at both ends of the chain with a radical-polymerizable unsaturated monomer (B) having the ion-reactive functional group (b1), or a radical-polymerizable resin (hereinafter, abbreviated as "radical-polymerizable resin (I-2)") obtained by allowing a compound (A') having a poly(perfluoroalkylene ether) chain and functional groups (a1) at both ends of the chain, the functional groups (a1) each having reactivity with an ion-reactive functional group (b1), and a compound (C) having a radical-polymerizable unsaturated group and a functional group (c1) having reactivity with the functional group (b1) to react with a polymer (P2) of a radical-polymerizable unsaturated monomer (B) having the ion-reactive functional group (b1).

Here, examples of the compound (A) having a structural site having a poly(perfluoroalkylene ether) chain and radical-polymerizable unsaturated groups at both ends of the chain, the compound (A) being used in the production of the radical-polymerizable resin (I-1), include compounds having the poly(perfluoroalkylene ether) chain (β) described above and radical-polymerizable unsaturated groups represented by any of structural formulae U'-1 to U'-4 below and located at both ends of the chain.

[Chem. 4]

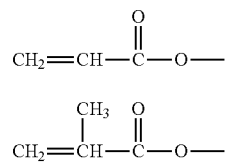

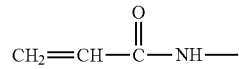

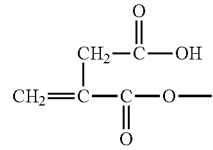

Among these radical-polymerizable unsaturated groups, in particular, from the standpoint of the ease of availability and production of the compound (A) itself or excellent reactivity with the above-described radical-polymerizable unsaturated monomers, an acryloyloxy group represented by structural formula U'-1 or a methacryloyloxy group represented by structural formula U'-2 is preferable.

Among the compounds (A), examples of the above-mentioned compounds having acryloyloxy groups or methacryloyloxy groups include compounds represented by structural formulae A-1 to A-10 below. Note that "-PFPE-" in each structural formula below represents a poly(perfluoroalkylene ether) chain.

[Chem. 5]

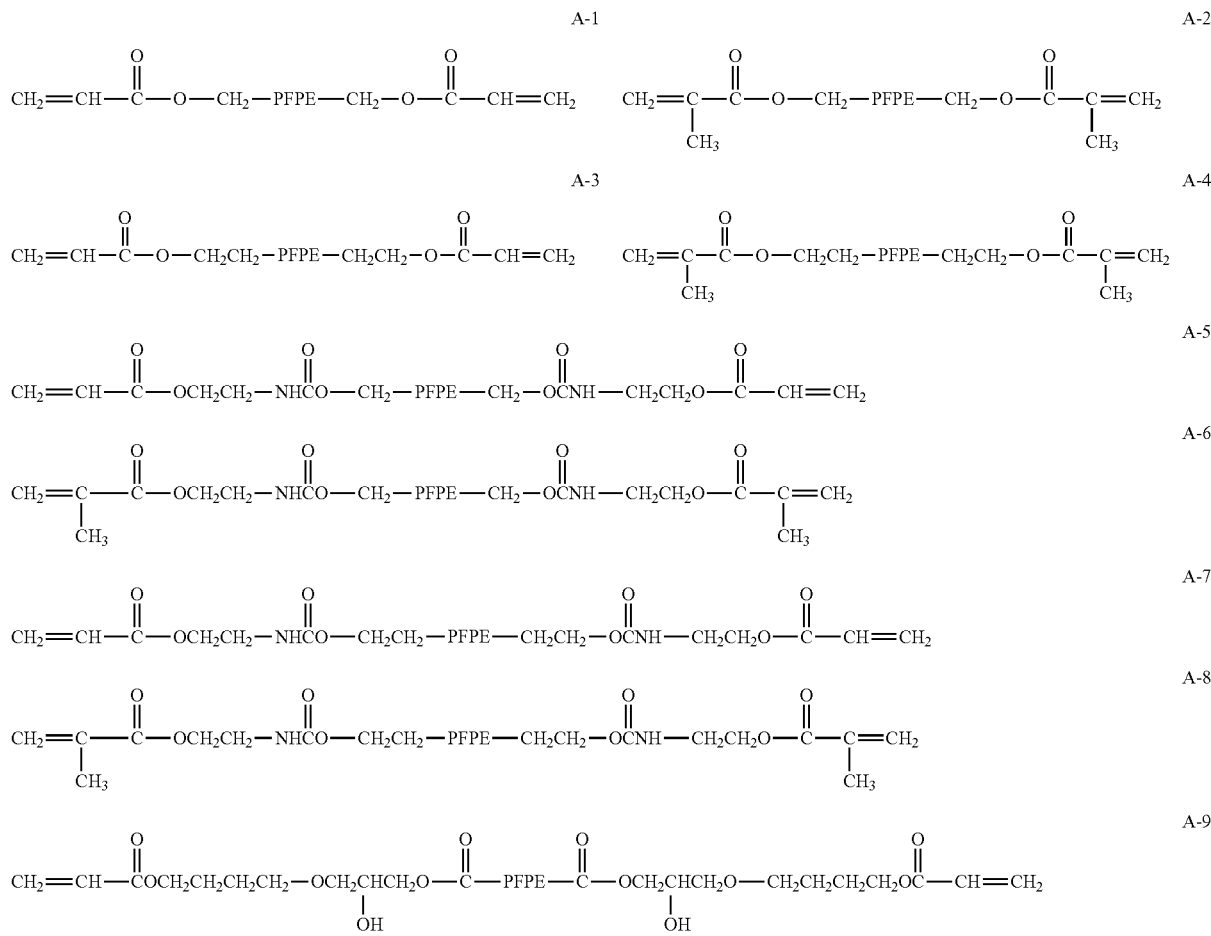

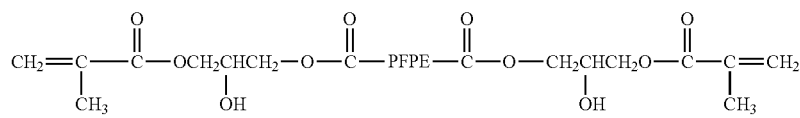

A-10

Among these, in particular, from the standpoint that the industrial production of the compound (A) itself is easy, and that a polymerization reaction in producing the polymer (P1) is also easy, compounds represented by structural formulae A-1 and A-5 above are preferable.

In order to produce the compound (A), for example, the following methods can be employed. A perfluoropolyether having one hydroxyl group at each end thereof may be subjected to any one of a dehydrochlorination reaction with (meth)acryloyl chloride, a dehydration reaction with (meth)acrylic acid, a urethanization reaction with 2-(meth)acryloyloxyethyl isocyanate, and an esterification reaction with itaconic anhydride. Alternatively, a perfluoropolyether having one carboxyl group at each end thereof may be subjected to an esterification reaction with 4-hydroxybutyl acrylate glycidyl ether or an esterification reaction with glycidyl methacrylate. Alternatively, a perfluoropolyether having one isocyanate group at each end thereof may be allowed to react with 2-hydroxyethyl acrylamide. Among these methods, the method in which a perfluoropolyether having one hydroxyl group at each end thereof is subjected to a dehydrochlorination reaction with (meth)acryloyl chloride or a urethanization reaction with 2-(meth)acryloyloxyethyl isocyanate is particularly preferable from the standpoint that the compound is easily obtained in terms of synthesis.

Here, an example of a method for producing the polymer (P1) is a method of polymerizing the compound (A), the radical-polymerizable unsaturated monomer (B) having an ion-reactive functional group (b1), and other optional radical-polymerizable unsaturated monomers in an organic solvent using a radical polymerization initiator. Preferable examples of the organic solvent used here include ketones, esters, amides, sulfoxides, ethers, and hydrocarbons. Specific examples thereof include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, and xylene. These organic solvents are appropriately selected in consideration of the boiling point, compatibility, and polymerizability. Examples of the radical polymerization initiator include peroxides such as benzoyl peroxide; and azo compounds such as azobisisobutylonitrile. Furthermore, a chain transfer agent such as lauryl mercaptan, 2-mercaptoethanol, thioglycerol, ethyl thioglycolate, or octyl thioglycolate may be used, as needed.

The molecular weight of the resulting polymer (P1) must be in a range in which cross-linking/insolubilization does not occur. When the molecular weight becomes excessively high, cross-linking/insolubilization may occur. Within the above range, from the standpoint that the number of polymerizable unsaturated groups of the finally obtained radical-polymerizable resin (I-1) per molecule becomes large, the polymer (P1) has a number-average molecular weight preferably in the range of 800 to 3,000, and particularly preferably in the range of 1,000 to 2,000, and a weight-average molecular weight preferably in the range of 1,500 to 20,000, and particularly preferably in the range of 2,000 to 5,000.

By allowing the compound (C) having a radical-polymerizable unsaturated group and a functional group (c1) having reactivity with the functional group (b1) to react with the polymer (P1) thus obtained, the target radical-polymerizable resin (I-1) is obtained.

Examples of the functional group (c1) present in the compound (C) include a hydroxyl group, an isocyanate group, a glycidyl group, and a carboxyl group. For example, when the ion-reactive functional group (b1) is a hydroxyl group, the functional group (c1) may be an isocyanate group. When the ion-reactive functional group (b1) is an isocyanate group, the functional group (c1) may be a hydroxyl group. When the ion-reactive functional group (b1) is a glycidyl group, the functional group (c1) may be a carboxyl group. When the ion-reactive functional group (b1) is a carboxyl group, the functional group (c1) may be a glycidyl group.

Specific examples of the compound (C) include 2-hydroxy-3-acryloyloxypropyl methacrylate, pentaerythritol triacrylate, and dipentaerythritol pentaacrylate besides the above-described compounds exemplified as the radical-polymerizable unsaturated monomer (B) having an ion-reactive functional group (b1).

Among these compounds, from the standpoint that polymerization curability by ultraviolet irradiation is particularly preferable, 2-hydroxyethyl acrylate, 2-hydroxypropyl acrylate, 3-hydroxypropyl acrylate, 2-hydroxybutyl acrylate, 4-hydroxybutyl acrylate, 1,4-cyclohexanedimethanol monoacrylate, N-(2-hydroxyethyl)acrylamide, 2-acryloyloxyethyl isocyanate, 4-hydroxybutyl acrylate glycidyl ether, and acrylic acid are preferable.

The method of allowing the compound (C) having a radical-polymerizable unsaturated group and the functional group (c1) having reactivity with the functional group (b1) to react with the polymer (P1) is performed under a condition in which the radical-polymerizable unsaturated group in the compound (C) is not polymerized. For example, the reaction is preferably conducted while the temperature condition is adjusted to be in the range of 30° C. to 120° C. This reaction is preferably conducted in the presence of a catalyst and a polymerization inhibitor, and if necessary, an organic solvent.

For example, when the functional group (b1) is a hydroxyl group and the functional group (c1) is an isocyanate group or when the functional group (b1) is an isocyanate group and the functional group (c1) is a hydroxyl group, the reaction is preferably conducted using p-methoxyphenol, hydroquinone, 2,6-ditert-butyl-4-methylphenol, or the like as a polymerization inhibitor, and dibutyltin dilaurate, dibutyltin diacetate, tin octoate, zinc octoate, or the like as a urethanization catalyst at a reaction temperature in the range of 40° C. to 120° C., in particular, in the range of 60° C. to 90° C.

When the functional group (b1) is a glycidyl group and the functional group (c1) is a carboxyl group or when the ion-reactive functional group (b1) is a carboxyl group and the functional group (c1) is a glycidyl group, the reaction is preferably conducted using p-methoxyphenol, hydroquinone, 2,6-ditert-butyl-4-methylphenol, or the like as a polymerization inhibitor, and a tertiary amine such as triethylamine, a quaternary ammonium such as tetramethylammonium chloride, a tertiary phosphine such as triphenylphosphine, a quaternary phosphonium such as tetrabutylphosphonium chloride, or the like as an esterification catalyst at a reaction temperature in the range of 80° C. to 130° C., in particular, in the range of 100° C. to 120° C.

Preferable examples of the organic solvent used in the above reaction include ketones, esters, amides, sulfoxides, ethers, and hydrocarbons. Specific examples thereof include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, and xylene. These organic solvents are appropriately selected in consideration of the boiling point and compatibility.

Next, in order to produce the radical-polymerizable resin (I-2), first, a radical-polymerizable unsaturated monomer (B) having an ion-reactive functional group (b1) is polymerized to produce a polymer (P2). In this step, as described above, other radical-polymerizable unsaturated monomers may be used in combination and copolymerized with the radical-polymerizable unsaturated monomer (B). An example of the polymerization method is a method for polymerizing the radical-polymerizable unsaturated monomer (B) having the ion-reactive functional group (b1), and the other optional radical-polymerizable unsaturated monomers with a radical polymerization initiator, as in the case of the production of the polymer (P1). In this step, the polymerization is preferably conducted in the presence of an organic solvent, and a chain transfer agent may be used, as needed. The same organic solvents, radical polymerization initiators, and chain transfer agents as those used in producing the polymer (P1) can be used.

When the molecular weight of the polymer (P2) thus obtained becomes excessively high, cross-linking/insolubilization may occur at the time of a reaction with a compound (A'). Therefore, from the standpoint of preventing the cross-linking/insolubilization, the polymer (P2) has a number-average molecular weight measured by gel permeation chromatography (GPC) preferably in the range of 800 to 3,000, and particularly preferably in the range of 1,000 to 2,000, and a weight-average molecular weight preferably in the range of 1,200 to 6,000, and particularly preferably in the range of 1,500 to 4,000.

Subsequently, the resulting polymer (P2) is allowed to react with the compound (A') having a poly(perfluoroalkylene ether) chain and functional groups (a1) at both ends of the chain, the functional groups (a1) each having reactivity with the ion-reactive functional group (b1), and a compound (C) having a radical-polymerizable unsaturated group and a functional group (c1) having reactivity with the functional group (b1), thereby obtaining the target radical-polymerizable resin (I-2).

In this step, the compound (A') may be allowed to react with the polymer (P2) in advance, and the compound (C) may then be allowed to react with the resulting product. The order of the reactions may be reversed. Alternatively, the compound (A') and the compound (C) may be allowed to react with the polymer (P2) at the same time.

From the standpoint that the advantages of the present invention are significantly achieved, preferably, the amount of ion-reactive functional group (b1) in the polymer (P2), the reaction ratio of the compound (A') to the ion-reactive functional group (b1), and the reaction ratio of the compound (C) to the ion-reactive functional group (b1) are appropriately adjusted. Specifically, the amount of ion-reactive functional group (b1) in the polymer (P2) is preferably in the range of 100 to 200 g/eq. from the standpoint that the concentration of the functional group is increased to further improve the stain-proof properties of a cured coating film. In addition, the reaction is preferably performed so that the ratio of the functional group (a1) in the compound (A') to one mole of the ion-reactive functional group (b1) is in the range of 0.05 to 0.20 mole, and the ratio of the functional group (c1) having reactivity in the compound (C) to one mole of the ion-reactive functional group (b1) is in the range of 0.80 to 0.95 mole.

Here, examples of the functional groups (a1) in the compound (A') having a poly(perfluoroalkylene ether) chain and functional groups (a1) at both ends of the chain, the functional groups (a1) each having reactivity with the ion-reactive functional group (b1), include a hydroxyl group, an isocyanate group, a glycidyl group, and a carboxyl group. For example, when the ion-reactive functional group (b1) is a hydroxyl group, each of the functional groups (a1) may be an isocyanate group. When the ion-reactive functional group (b1) is an isocyanate group, the each of the functional groups (a1) may be a hydroxyl group. When the ion-reactive functional group (b1) is a glycidyl group, each of the functional groups (a1) may be a carboxyl group. When the ion-reactive functional group (b1) is a carboxyl group, each of the functional groups (a1) may be a glycidyl group.

Examples of the compound (A') include compounds represented by structural formula A'-1 to A'-6 below, and compounds modified with, for example, a polyfunctional isocyanate compound such as hexamethylene diisocyanate or tolylene diisocyanate or a bifunctional epoxy resin such as a bisphenol epoxy resin. Note that "-PFPE-" in each structural formula below represents a poly(perfluoroalkylene ether) chain. Among these compounds, unmodified compounds represented by structural formula A'-1 to A'-6 below are preferable. In particular, when the functional group (b1) is an isocyanate group, the compound (A') represented by structural formula A'-1 below is preferable from the standpoint of high reactivity with the functional group (b1).

[Chem. 6]

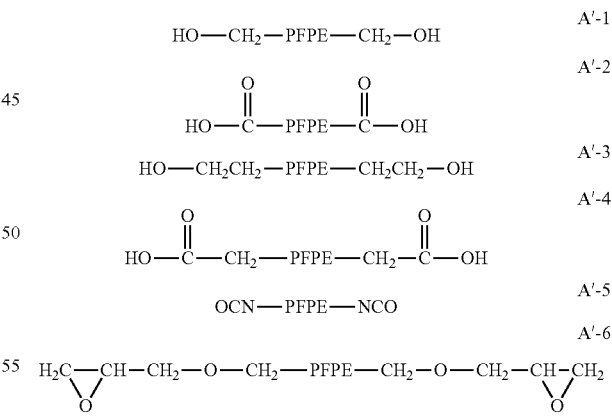

The compound (C) used here is the same as the compound (C) used in the above-described production of the radical-polymerizable resin (I-1).

As for the reaction among the polymer (P2), the compound (A'), and the compound (C), as described above, the polymer (P2) and compound (A') may be allowed to react with each other, and the compound (C) may then be allowed to react with the resulting product. Alternatively, the polymer (P2) and the compound (C) may be allowed to react with each other, and the compound (A') may then be allowed to react with the resulting product. Alternatively, the compound (A') and the compound (C) may be allowed to react with the polymer (P2) at the same time. In any of these methods, the reaction conditions can be appropriately selected in accordance with the types of functional groups that participate in the reactions.

For example, when one of the functional group (b1) in the polymer (P2) and the functional group (a1) in the compound (A') is a hydroxyl group and the other is an isocyanate group or when one of the functional group (b1) in the polymer (P2) and the functional group (c1) in the compound (C) is a hydroxyl group and the other is an isocyanate group, the reaction is preferably conducted using p-methoxyphenol, hydroquinone, 2,6-ditert-butyl-4-methylphenol, or the like as a polymerization inhibitor, and dibutyltin dilaurate, dibutyltin diacetate, tin octoate, zinc octoate, or the like as a urethanization catalyst at a reaction temperature in the range of 40° C. to 120° C., in particular, in the range of 60° C. to 90° C.

When one of the functional group (b1) in the polymer (P2) and the functional group (a1) in the compound (A') is a carboxyl group and the other is a glycidyl group or when one of the functional group (b1) in the polymer (P2) and the functional group (c1) in the compound (C) is a carboxyl group and the other is a glycidyl group, the reaction is preferably conducted using p-methoxyphenol, hydroquinone, 2,6-di-tert-butyl-4-methylphenol, or the like⊤ as a polymerization inhibitor, and a tertiary amine such as triethylamine, a quaternary ammonium such as tetramethylammonium chloride, a tertiary phosphine such as triphenylphosphine, a quaternary phosphonium such as tetrabutylphosphonium chloride, or the like as an esterification catalyst at a reaction temperature in the range of 80° C. to 130° C., in particular, in the range of 100° C. to 120° C.

In these reactions, an organic solvent may be used, as needed. Examples of the organic solvent that can be used include ketones, esters, amides, sulfoxides, ethers, and hydrocarbons. Specific examples thereof include acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, and xylene. These organic solvents are appropriately selected in consideration of the boiling point and compatibility.

The radical-polymerizable resin (I) typified by the radical-polymerizable resin (I-1) or the radical-polymerizable resin (I-2) preferably has a number-average molecular weight (Mn) in the range of 1,500 to 5,000, and a weight-average molecular weight (Mw) in the range of 4,000 to 50,000 from the standpoint that a highly cross-linked resin that exhibits coating film properties such as excellent stain-proof properties can be obtained without causing gelation in producing these resins.

Herein, the number-average molecular weight (Mn) and the weight-average molecular weight (Mw) are values determined by GPC on the polystyrene equivalent basis. The measurement conditions for the GPC are as follows.

[Measurement Conditions for GPC]
Measurement apparatus: "HLC-8220 GPC" produced by Tosoh Corporation
Columns: Guard column "HHR-H" (6.0 mm I.D.×4 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
Detector: Evaporative light-scattering detector (ELSD) ("ELSD 2000" produced by Alltech)
Data processing: "GPC-8020 model II Version 4.10" produced by Tosoh Corporation
Measurement Conditions:

| Column temperature | 40° C. |
| Developing solvent | Tetrahydrofuran |
| Flow rate | 1.0 mL/min. |

Standard: In accordance with a measurement manual of the "GPC-8020 model II Version 4.10", the following monodisperse polystyrenes having known molecular weights were used.

(Polystyrenes Used)
"A-500" produced by Tosoh Corporation
"A-1000" produced by Tosoh Corporation
"A-2500" produced by Tosoh Corporation
"A-5000" produced by Tosoh Corporation
"F-1" produced by Tosoh Corporation
"F-2" produced by Tosoh Corporation
"F-4" produced by Tosoh Corporation
"F-10" produced by Tosoh Corporation
"F-20" produced by Tosoh Corporation
"F-40" produced by Tosoh Corporation
"F-80" produced by Tosoh Corporation
"F-128" produced by Tosoh Corporation
Sample: A sample prepared by filtering a 1.0 mass percent tetrahydrofuran solution in terms of resin solid content with a microfilter (100 µL).

The radical-polymerizable resin (I) preferably contains fluorine atoms in a proportion of 2 to 25 mass percent therein from the standpoint of the stain-proof properties of the resulting cured coating film.

Furthermore, the content of the radical-polymerizable unsaturated group in the radical-polymerizable resin (I) is preferably in a proportion of 250 to 500 g/eq. in terms of radical-polymerizable unsaturated group equivalent from the standpoint that the resulting cured coating film has excellent stain-proof properties, and particularly preferably in the range of 300 to 400 g/eq.

The radical-polymerizable resin (I) itself, which has been described in detail above, can be used as a base resin of a coating composition and used in combination with a polymerization initiator (II). However, since the radical-polymerizable resin (I) is characterized in that it has excellent surface modification properties as a fluorine-containing surfactant or a fluorine-containing surface modifier and can impart excellent stain-proof properties to the resulting cured coating film, the radical-polymerizable resin (I) is preferably used as a fluorine-containing surfactant or a fluorine-containing surface modifier in a coating composition containing another active-energy-ray-curable resin (III) or an active-energy-ray-curable monomer (IV) as a main component and further containing a polymerization initiator (II).

Here, examples of the other active-energy-ray-curable resin (III) include urethane (meth)acrylate resins, unsaturated polyester resins, epoxy (meth)acrylate resins, polyester (meth)acrylate resins, and acrylic (meth)acrylate resins. In the present invention, urethane (meth)acrylate resins are preferable from the standpoint of transparency, a low shrinking property etc.

Examples of the urethane (meth)acrylate resins used here include resins having a urethane bond and a (meth)acryloyl group and obtained by allowing an aliphatic polyisocyanate compound or an aromatic polyisocyanate compound to react with a hydroxy group-containing (meth)acrylate compound.

Examples of the aliphatic polyisocyanate compound include tetramethylene diisocyanate, pentamethylene diisocyanate, hexamethylene diisocyanate (hereinafter, abbreviated as "HDI"), heptamethylene diisocyanate, octamethylene diisocyanate, decamethylene diisocyanate, 2-methyl-1,5-pentane diisocyanate, 3-methyl-1,5-pentane diisocyanate, dodecamethylene diisocyanate, 2-methylpentamethylene diisocyanate, 2,2,4-trimethyl hexamethylene diisocyanate, 2,4,4-trimethyl hexamethylene diisocyanate, isophorone diisocyanate, norbornane diisocyanate, hydrogenated diphenylmethane diisocyanate, hydrogenated tolylene diisocyanate, hydrogenated xylylene diisocyanate, hydrogenated tetramethyl xylylene diisocyanate, and cyclohexyl diisocyanate. Examples of the aromatic polyisocyanate compound include tolylene diisocyanate, 4,4'-diphenylmethane diisocyanate, xylylene diisocyanate, 1,5-naphthalene diisocyanate, tolidine diisocyanate, and p-phenylene diisocyanate.

Examples of the hydroxy group-containing (meth)acrylate compound include mono(meth)acrylates of a dihydric alcohol, such as 2-hydroxyethyl (meth)acrylate, 2-hydroxypropyl (meth)acrylate, 2-hydroxybutyl (meth)acrylate, 4-hydroxybutyl (meth)acrylate, 1,5-pentanediol mono(meth)acrylate, 1,6-hexanediol mono(meth)acrylate, neopentyl glycol mono(meth)acrylate, and hydroxypivalic acid neopentyl glycol mono(meth)acrylate; mono- or di(meth)acrylates of a trihydric alcohol, such as trimethylolpropane di(meth)acrylate, ethoxylated trimethylolpropane (meth)acrylate, propoxylated trimethylolpropane (meth)acrylate, glycerol di(meth)acrylate, and di(meth)acryloyloxyethyl-hydroxyethyl-isocyanurate; and hydroxyl group-containing mono- and di(meth)acrylates in which some of these alcoholic hydroxyl groups are modified with ε-caprolactone.

Examples thereof further include compounds having a monofunctional hydroxyl group and a trifunctional or higher-functional (meth)acryloyl group, such as pentaerythritol tri(meth)acrylate, ditrimethylolpropane tri(meth)acrylate, and dipentaerythritol penta(meth)acrylate; and hydroxyl group-containing polyfunctional (meth)acrylates in which any of these compounds is further modified with ε-caprolactone.

Examples thereof further include (meth)acrylate compounds having an oxyalkylene chain, such as dipropylene glycol mono(meth)acrylate, diethylene glycol mono(meth)acrylate, polypropylene glycol mono(meth)acrylate, and polyethylene glycol mono(meth)acrylate; (meth)acrylate compounds having a block-structured oxyalkylene chain, such as polyethylene glycol-polypropylene glycol mono(meth)acrylate and polyoxybutylene-polyoxypropylene mono(meth)acrylate; and (meth)acrylate compounds having a random-structured oxyalkylene chain, such as poly(ethylene glycol-tetramethylene glycol) mono(meth)acrylate and poly(propylene glycol-tetramethylene glycol) mono(meth)acrylate.

The above-mentioned reaction between an aliphatic polyisocyanate compound or an aromatic polyisocyanate compound and a hydroxy group-containing acrylate compound can be conducted by an ordinary method in the presence of a urethanization catalyst. Specific examples of the urethanization catalyst that can be used here include amines such as pyridine, pyrrole, triethylamine, diethylamine, and dibutylamine; phosphines such as triphenylphosphine and triethylphosphine; organotin compounds such as dibutyltin dilaurate, octyltin trilaurate, octyltin diacetate, dibutyltin diacetate, and tin octoate; and organometallic compounds such as zinc octoate.

Among these urethane acrylate resins, resins obtained by allowing an aliphatic polyisocyanate compound to react with a hydroxy group-containing (meth)acrylate compound are particularly preferable from the standpoint that such resins can provide a cured coating film having excellent transparency, have a satisfactory sensitivity to active energy rays, and are excellent in terms of curability.

Next, the unsaturated polyester resins are curable resins obtained by polycondensation of an $\alpha,\beta$-unsaturated dibasic acid or an acid anhydride thereof, or an aromatic saturated dibasic acid or an acid anhydride thereof, and a glycol. Examples of the $\alpha,\beta$-unsaturated dibasic acid or an acid anhydride thereof include maleic acid, maleic anhydride, fumaric acid, itaconic acid, citraconic acid, chloromaleic acid, and esters thereof. Examples of the aromatic saturated dibasic acid or an acid anhydride thereof include phthalic acid, phthalic anhydride, isophthalic acid, terephthalic acid, nitrophthalic acid, tetrahydrophthalic anhydride, endomethylene tetrahydrophthalic anhydride, halogenated phthalic anhydrides, and esters thereof. Examples of an aliphatic or alicyclic saturated dibasic acid include oxalic acid, malonic acid, succinic acid, adipic acid, sebacic acid, azelaic acid, glutaric acid, hexahydrophthalic anhydride, and esters thereof. Examples of the glycol include ethylene glycol, propylene glycol, diethylene glycol, dipropylene glycol, 1,3-butanediol, 1,4-butanediol, 2-methylpropane-1,3-diol, neopentyl glycol, triethylene glycol, tetraethylene glycol, 1,5-pentanediol, 1,6-hexanediol, bisphenol A, hydrogenated bisphenol A, ethylene glycol carbonate, and 2,2-di-(4-hydroxypropoxydiphenyl) propane. Furthermore, oxides such as ethylene oxide and propylene oxide may also be used.

Next, examples of an epoxy vinyl ester resin include resins obtained by allowing (meth)acrylic acid to react with a glycidyl group of an epoxy resin such as a bisphenol A epoxy resin, a bisphenol F epoxy resin, a phenol-novolak epoxy resin, or a cresol-novolak epoxy resin.

Next, examples of the active-energy-ray-curable monomer (IV) include ethylene glycol di(meth)acrylate, diethylene glycol di(meth)acrylate, triethylene glycol di(meth)acrylate, polyethylene glycol di(meth)acrylate having a number-average molecular weight in the range of 150 to 1,000, propylene glycol di(meth)acrylate, dipropylene glycol di(meth)acrylate, tripropylene glycol di(meth)acrylate, polypropylene glycol di(meth)acrylate having a number-average molecular weight in the range of 150 to 1,000, neopentyl glycol di(meth)acrylate, 1,3-butanediol di(meth)acrylate, 1,4-butanediol di(meth)acrylate, 1,6-hexanediol di(meth)acrylate, hydroxypivalic acid ester neopentyl glycol di(meth)acrylate, bisphenol A di(meth)acrylate, trimethylolpropane tri(meth)acrylate, pentaerythritol tri(meth)acrylate, dipentaerythritol hexa(meth)acrylate, pentaerythritol tetra(meth)acrylate, trimethylolpropane di(meth)acrylate, dipentaerythritol penta(meth)acrylate, and dicyclopentenyl (meth)acrylate.

Examples of the active-energy-ray-curable monomer (IV) further include aliphatic alkyl (meth)acrylates such as methyl (meth)acrylate, propyl(meth)acrylate, butyl (meth)acrylate, t-butyl (meth)acrylate, 2-ethylhexyl (meth)acrylate, octyl (meth)acrylate), decyl (meth)acrylate, isodecyl (meth)acrylate, lauryl (meth)acrylate, stearyl (meth)acrylate, and isostearyl (meth)acrylate; glycerol (meth)acrylate, 2-hydroxyethyl (meth)acrylate, 3-chloro-2-hydroxypropyl (meth) acrylate, glycidyl (meth)acrylate, allyl (meth)acrylate, 2-butoxyethyl (meth)acrylate, 2-(diethylamino)ethyl (meth)acrylate, 2-(dimethylamino)ethyl (meth)acrylate, γ-(meth)acryloxypropyltrimethoxysilane, 2-methoxyethyl (meth)acrylate, methoxydiethylene glycol (meth)acrylate, methoxydipropylene glycol (meth)acrylate, nonylphenoxypolyethylene glycol (meth)acrylate, nonylphenoxypolypropylene glycol (meth)acrylate, phenoxyethyl (meth)acrylate, phenoxydipropylene glycol (meth)acrylate, phenoxypolypropylene glycol (meth)acrylate, polybutadiene (meth)acrylate, polyethylene glycol-polypropylene glycol (meth)acrylate, polyethylene glycol-polybutylene glycol (meth)acrylate, polystyrylethyl (meth)acrylate, benzyl (meth)acrylate, cyclohexyl (meth)acrylate, dicyclopentanyl (meth)acrylate, dicyclopentenyl (meth)acrylate, isobornyl (meth)acrylate, methoxylated cyclodecatriene (meth)acrylate, and phenyl (meth)acrylate.

Among these monomers, from the standpoint that the resulting cured coating film is particularly excellent in terms of hardness, trifunctional or higher polyfunctional (meth)acrylates such as trimethylolpropane tri(meth)acrylate, pentaerythritol tri(meth)acrylate, dipentaerythritol hexa(meth)acrylate, and pentaerythritol tetra(meth)acrylate are preferable.

Next, examples of the polymerization initiator (II) include benzophenone, acetophenone, benzoin, benzoin ethyl ether, benzoin isobutyl ether, benzyl methyl ketal, azobisisobutyronitrile, 1-hydroxycyclohexyl phenyl ketone, 2-hydroxy-2-methyl-1-phenyl-1-one, 1-(4'-isopropylphenyl)-2-hydroxy-2-methylpropan-1-one, 1-(4'-dodecylphenyl)-2-hydroxy-2-methylpropan-1-one, 3,3',4,4'-tetra(t-butylperoxycarbonyl) benzophenone, 4,4"-diethylisophthalophene, 2,2-dimethoxy-1,2-diphenylethan-1-one, benzoin isopropyl ether, thioxanthone, 2-chlorothioxanthone, 2-methylthioxanthone, 2-isopropylthioxanthone, 2-methyl-1[4-(methylthio)phenyl]-2-morpholinopropan-1-one, 2-benzyl-2-dimethylamino-1-(4-morpholinophenyl)-butanone-1, bis(2,6-dimethoxybenzoyl)-2,4,4-trimethyl-pentylphosphine oxide, bis(2,4,6,-trimethylbenzoyl)-phenylphosphine oxide, and 2,4,6-trimethylbenzoyl diphenylphosphine oxide. These polymerization initiators may be used alone or in combination of two or more. Among these polymerization initiators, from the standpoint of excellent compatibility with the monomer (B) in the composition, 1-hydroxycyclohexyl phenyl ketone and benzophenone are preferable, and 1-hydroxycyclohexyl phenyl ketone is particularly preferable.

A photosensitizer such as an amine compound or a phosphorus compound may be optionally added so as to conduct the polymerization more rapidly.

The content of the polymerization initiator (II) in the active-energy-ray-curable coating composition of the present invention is preferably in the range of 0.01 to 15 mass percent, and particularly preferably in the range of 0.3 to 7 mass percent on the basis of the total mass of the curable component in the composition, i.e., on the basis of the total mass of the radical-polymerizable resin (I) and the polymerization initiator (II) or, in the case where the other active-energy-ray-curable resin (III) or active-energy-ray-curable monomer (IV) is used in combination, on the basis of the total mass of components including the other resin (III) or monomer (IV), the components participating in the curing reaction.

Furthermore, in order to adjust the viscosity and the refractive index, to adjust the color tone of coating films, or to adjust other properties of the coating or physical properties of coating films, various blending components may be used in combination with the active-energy-ray-curable coating composition of the present invention in accordance with the purposes such as the use and properties so long as the advantages of the present invention are not impaired. Examples of the blending components include various organic solvents; various resins such as acrylic resins, phenolic resins, polyester resins, polystyrene resins, urethane resins, urea resins, melamine resins, alkyd resins, epoxy resins, polyamide resins, polycarbonate resins, petroleum resins, and fluorocarbon resins; various organic or inorganic particles such as fine particles of polytetrafluoroethylene (PTFE), polyethylene, polypropylene, carbon, titanium oxide, alumina, copper, or silica; polymerization initiators, polymerization inhibitor, antistatic agents, antifoaming agents, viscosity adjusters, light stabilizers, weathering stabilizers, heat stabilizers, antioxidants, antirust agents, slipping agents, wax, gloss-adjusting agents, mold-releasing agents, compatibilizers, electrical conductivity-adjusting agents, pigments, dyes, dispersing agents, dispersion stabilizers, silicone-based surfactants, and hydrocarbon-based surfactants.

Among the above blending components, the organic solvents are useful for appropriately adjusting the viscosity of a solution of the active-energy-ray-curable coating composition of the present invention. In particular, in order to perform thin-film coating, the film thickness can be easily adjusted. Examples of the organic solvents that can be used here include methyl isobutyl ketone, methyl ethyl ketone, methanol, ethanol, t-butanol, and isopropanol. These organic solvents may be used alone or as a mixed solvent in which two or more types of solvents are combined.

The amount of organic solvent used varies depending on the use and the target film thickness and viscosity, but is preferably in the range of 0.5 to 2 times the total mass of the curable component on a mass basis.

Examples of the active energy rays for curing the active-energy-ray-curable coating composition of the present invention include active energy rays such as light, electron beams, and radiations. Specific examples of an energy source or a curing device include germicidal lamps, fluorescent lamps for ultraviolet rays, carbon arc lamps, xenon lamps, high-pressure mercury lamps used for a copy, medium-pressure mercury lamps, high-pressure mercury lamps, ultra-high pressure mercury lamps, electrodeless lamps, metal halide lamps, ultraviolet rays, the light source of which is natural light or the like, and electron beams provided by a scanning- or curtain-type electron beam accelerator.

Among these active energy rays, ultraviolet rays are particularly preferable, and irradiation is preferably performed in an atmosphere of an inert gas such as nitrogen gas from the standpoint of realizing a high polymerization efficiency. Furthermore, curing may be conducted optionally using heat as an energy source in combination with active energy rays, and heat treatment may then be conducted.

In the active-energy-ray-curable coating composition of the present invention, when the radical-polymerizable resin (I) is used as a fluorine-containing surfactant or a fluorine-containing surface modifier, the amount of resin used is preferably in the range of 0.01 to 10 mass percent, and particularly preferably 0.1 to 5 mass percent of the total mass of the curable components from the standpoint of the leveling property, water/oil repellency, and stain-proof properties, and from the standpoint that degradation of the hardness and transparency of the composition after curing is small. In this case, the blending ratio of the other active-energy-ray-curable resin (III) or the active-energy-ray-curable monomer (IV) to the total mass of the curable components is preferably in the range of 85 to 99.5 mass percent, and the blending ratio of the polymerization initiator (II) to the total mass of the curable components is preferably in the range of 0.01 to 15 mass percent, and particularly preferably in the range of 0.3 to 7 mass percent.

The method for coating the active-energy-ray-curable coating composition of the present invention is different depending on the use thereof. Examples of the method include coating methods using a gravure coater, a roll coater, a comma coater, a knife coater, a curtain coater, a shower coater, a spin coater, dipping, screen printing, a spray, an applicator, a bar coater, or the like; and forming methods using a mold. In addition, from the standpoint of realizing a high polymerization efficiency, irradiation is preferably performed in an atmosphere of an inert gas such as nitrogen gas.

The active-energy-ray-curable coating composition of the present invention can be widely used as coating materials for coating a protective film for a polarizer for liquid crystal displays, the protective film being typified by a TAC film; coatings, ink, or black resists for a black matrix used in a color filter for liquid crystal displays; hard-coating agents for touch panels; hard-coating agents for mobile phone cases; hard-coating agents for a liquid crystal display or an organic electroluminescent (EL) display of mobile phones; optical fiber cladding materials; optical lenses; waveguides; liquid-crystal sealing materials; sealing materials for optical applications; protective films; adhesives for optical applications; optical components; and antireflection films. Among these applications, the active-energy-ray-curable coating composition of the present invention is particularly useful as coating materials for coating a protective film for a polarizer for liquid crystal displays; and coatings, ink, or black resists for a black matrix used in a color filter for liquid crystal displays. In particular, among the applications to coating materials for coating a protective film for a polarizer for liquid crystal displays, when the composition of the present invention is used as an anti-glare coating material, in the above-described compositions, inorganic or organic fine particles such as silica fine particles, acrylic resin fine particles, or polystyrene resin fine particles are preferably mixed in a proportion of 0.1 to 0.5 times the total mass of the curable components in terms of excellent anti-glare property.

EXAMPLES

The present invention will now be described in more detail by way of specific Synthesis Examples and Examples.

[IR Spectrum]
Apparatus: "NICOLET 380" produced by Thermo Electron Corporation
A resin solution obtained in each Example was measured by an attenuated total reflection (ATR) method.
[Measurement Conditions for $^{13}$C-NMR]
Apparatus: AL-400 produced by JEOL Ltd.
Solvent: Acetone-$d_6$
[Measurement Conditions for $^{19}$F-NMR]
Apparatus: AL-400 produced by JEOL Ltd.
Solvent: Acetone-$d_6$
[Measurement Conditions for GPC]
Measurement apparatus: "HLC-8220 GPC" produced by Tosoh Corporation
Columns: Guard column "HHR-H" (6.0 mm I.D.×4 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
"TSK-GEL GMHHR" (7.8 mm I.D.×30 cm) produced by Tosoh Corporation
Detector: ELSD ("ELSD 2000" produced by Alltech)
Data processing: "GPC-8020 model II Version 4.10" produced by Tosoh Corporation
Measurement Conditions:
Column temperature 40° C.
Developing solvent Tetrahydrofuran
Flow rate 1.0 mL/min.
Standard: In accordance with a measurement manual of the "GPC-8020 model II Version 4.10", the following monodisperse polystyrenes having known molecular weights were used.
(Polystyrenes Used)
"A-500" produced by Tosoh Corporation
"A-1000" produced by Tosoh Corporation
"A-2500" produced by Tosoh Corporation
"A-5000" produced by Tosoh Corporation
"F-1" produced by Tosoh Corporation
"F-2" produced by Tosoh Corporation
"F-4" produced by Tosoh Corporation
"F-10" produced by Tosoh Corporation
"F-20" produced by Tosoh Corporation
"F-40" produced by Tosoh Corporation
"F-80" produced by Tosoh Corporation
"F-128" produced by Tosoh Corporation
Sample: A sample prepared by filtering a 1.0 mass percent tetrahydrofuran solution in terms of resin solid content with a microfilter (100 μL).

Example 1

In a glass flask equipped with a stirrer, a thermometer, a condenser, and a dropping device, 20 parts by mass of a perfluoropolyether compound (X-1) represented by structural formula (X-1) below, the compound (X-1) having 25 to 80 fluorine atoms and having hydroxyl groups at both ends thereof:

[Chem. 7]

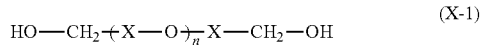

(X-1)

(wherein X represents a perfluoromethylene group and a perfluoroethylene group, seven perfluoromethylene groups and eight perfluoroethylene groups are present per molecule on average, the number of fluorine atoms is 46 on average, and the number-average molecular weight measured by GPC is 1,500), 20 parts by mass of diisopropyl ether serving as a solvent, 0.02 parts by mass of p-methoxyphenol serving as a polymerization inhibitor, and 3.1 parts by mass of triethylamine serving as a neutralizing agent were charged, stirring was started in an air flow, and 2.7 parts by mass of acryloyl chloride was added dropwise to the mixture over a period of one hour while the temperature in the flask was maintained at 10° C. After the dropwise addition, stirring was conducted at 10° C. for one hour, the temperature was increased and stirring was conducted at 30° C. for one hour, and the temperature was then increased to 50° C. and stirring was conducted for 10 hours, thereby conducting a reaction. Disappearance of acryloyl chloride was confirmed by gas chromatography. Next, 40 parts by mass of diisopropyl ether was added as a solvent. Subsequently, washing was repeated three times by a method in which 80 parts by mass of ion-exchange water was mixed, the resulting mixture was stirred and then allowed to stand to separate an aqueous layer, and the aqueous layer was then removed. Next, 0.02 parts by mass of p-methoxyphenol was added as a polymerization inhibitor, 8 parts by mass of magnesium sulfate was added as a dehydrating agent, and the resulting mixture was allowed to stand for one day to completely dehydrate the mixture. The dehydrating agent was then separated by filtering. Subsequently, the solvent was distilled off under reduced pressure to obtain 21.5 parts by mass of a monomer (A-1-1) represented by structural formula (A-1-1) below:

[Chem. 8]

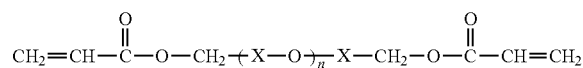

(A-1-1)

(wherein X represents a perfluoromethylene group and a perfluoroethylene group, seven perfluoromethylene groups and eight perfluoroethylene groups are present per molecule on average, and the number of fluorine atoms is 46 on average).

Next, in another glass flask equipped with a stirrer, a thermometer, a condenser, and dropping devices, 63 parts by mass of methyl isobutyl ketone serving as a solvent was charged, and the temperature was increased to 105° C. while stirring in a nitrogen flow. Subsequently, three types of dropping liquids, namely, 21.5 parts by mass of the monomer (A-1-1), 41.3 parts by mass of 2-hydroxyethyl methacrylate, and 135.4 parts by mass of an initiator solution prepared by mixing 9.4 parts by mass of t-butylperoxy-2-ethylhexanoate serving as a radical polymerization initiator with 126 parts by mass of methyl isobutyl ketone serving as a solvent were separately set in the dropping devices, and added dropwise at the same time over a period of two hours while the temperature in the flask was maintained at 105° C. After the dropwise addition, stirring was conducted at 105° C. for 10 hours, and the solvent was then distilled off under reduced pressure to obtain 67.5 parts by mass of a polymer (P1-1).

Next, 74.7 parts by mass of methyl ethyl ketone serving as a solvent, 0.1 parts by mass of p-methoxyphenol serving as a polymerization inhibitor, and 0.06 parts by mass of dibutyltin dilaurate serving as a urethanization catalyst were charged, stirring was started in an air flow, and 44.8 parts by mass of 2-acryloyloxyethyl isocyanate was added dropwise to the reaction mixture over a period of one hour while a temperature of 60° C. was maintained. After the dropwise addition, stirring was conducted at 60° C. for one hour, and the temperature was then increased to 80° C. and stirring was conducted for 10 hours, thereby conducting a reaction. As a result, disappearance of an isocyanate group was confirmed by IR spectroscopy. Next, 37.4 parts by mass of methyl ethyl ketone was added as a solvent to obtain 224.6 parts by mass of a methyl ethyl ketone solution containing a radical-polymerizable resin (Y-1) in an amount of 50%. According to the results of the molecular weights of the radical-polymerizable resin (Y-1) determined by GPC (molecular weights determined on the polystyrene equivalent basis), the number-average molecular weight was 2,400, the weight-average molecular weight was 7,100, and the maximum molecular weight was 200,000. FIG. 1 shows an IR spectrum chart of the radical-polymerizable resin (Y-1), FIG. 2 shows a $^{13}$C-NMR chart of the radical-polymerizable resin (Y-1), and FIG. 3 shows a $^{19}$F-NMR chart of the radical-polymerizable resin (Y-1).

Example 2

In a glass flask equipped with a stirrer, a thermometer, a condenser, and dropping devices, 63 parts by mass of methyl isobutyl ketone serving as a solvent was charged, and the temperature was increased to 105° C. while stirring in a nitrogen flow. Subsequently, three types of dropping liquids, namely, 21.5 parts by mass of the monomer (A-1-1) obtained in Example 1, 41.3 parts by mass of 2-hydroxyethyl methacrylate, and 132.3 parts by mass of an initiator solution prepared by mixing 6.3 parts by mass of t-butylperoxy-2-ethylhexanoate serving as a radical polymerization initiator with 126 parts by mass of methyl isobutyl ketone serving as a solvent were separately set in the dropping devices, and added dropwise at the same time over a period of two hours while the temperature in the flask was maintained at 105° C. After the dropwise addition, stirring was conducted at 105° C. for 10 hours, and the solvent was then distilled off under reduced pressure to obtain 66.0 parts by mass of a polymer (P1-1).

Next, 74.0 parts by mass of methyl ethyl ketone serving as a solvent, 0.1 parts by mass of p-methoxyphenol serving as a polymerization inhibitor, and 0.06 parts by mass of dibutyltin dilaurate serving as a urethanization catalyst were charged, stirring was started in an air flow, and 44.8 parts by mass of 2-acryloyloxyethyl isocyanate was added dropwise to the reaction mixture over a period of one hour while a temperature of 60° C. was maintained. After the dropwise addition, stirring was conducted at 60° C. for one hour, and the temperature was then increased to 80° C. and stirring was conducted for 10 hours, thereby conducting a reaction. As a result, disappearance of an isocyanate group was confirmed by IR spectroscopy. Next, 37.0 parts by mass of methyl ethyl ketone was added as a solvent to obtain 222.0 parts by mass of a methyl ethyl ketone solution containing a radical-polymerizable resin (Y-2) in an amount of 50%. According to the results of the molecular weights of the (Y-2) determined by GPC (molecular weights determined on the polystyrene equivalent basis), the number-average molecular weight was 3,100, the weight-average molecular weight was 25,500, and the maximum molecular weight was 2,000,000.

Example 3

In a glass flask equipped with a stirrer, a thermometer, a condenser, and dropping devices, 60 parts by mass of methyl isobutyl ketone serving as a solvent was charged, and the temperature was increased to 105° C. while stirring in a nitrogen flow. Subsequently, two types of dropping liquids, namely, 120 parts by mass of a monomer solution prepared by mixing 60 parts by mass of 2-methacryloyloxyethyl isocyanate with 60 parts by mass of methyl isobutyl ketone serving as a solvent, and 69.0 parts by mass of an initiator solution prepared by mixing 9.0 parts by mass of 2,2'-azobis(2-methylbutyronitrile) serving as a radical polymerization initiator with 60 parts by mass of methyl isobutyl ketone serving as a solvent were separately set in the dropping devices, and added dropwise at the same time over a period of two hours while the temperature in the flask was maintained at 105° C. After the dropwise addition, stirring was conducted at 105° C. for three hours. Subsequently, 9.9 parts by mass of an initiator solution prepared by mixing 0.9 parts by mass of 2,2'-azobis(2-methylbutyronitrile) serving as a radical polymerization initiator with 9 parts by mass of methyl isobutyl ketone serving as a solvent was added dropwise to the reaction mixture over a period of 10 minutes while the temperature in the flask was maintained at 105° C. After the dropwise addition, stirring was conducted at 105° C. for three hours. Subsequently, the dropwise addition was similarly conducted again, stirring was then conducted at 105° C. for eight hours to obtain 268.8 parts by mass of a methyl isobutyl ketone solution containing 62.4 parts by mass of a polymer (P2-1) as a polymer (P2).

Subsequently, the temperature in the flask was decreased to 80° C., 0.06 parts by mass of dibutyltin dilaurate serving as a urethanization catalyst was charged, and 23.2 parts by mass of the same perfluoropolyether compound (X-1) as that used in Example 1 was added thereto. A reaction was conducted by stirring at 80° C. for six hours to obtain 292.1 parts of a methyl isobutyl ketone solution containing 85.6 parts by mass of a reaction product (P3-1).

Subsequently, the nitrogen flow was switched to an air flow, and 0.12 parts by mass of p-methoxyphenol was added as a polymerization inhibitor. Subsequently, 41.4 parts by mass of 2-hydroxyethyl acrylate was added, and the resulting solution was stirred at 80° C. for 10 hours to conduct a reaction. Next, the temperature was increased to 120° C. and stirring was conducted for two hours, thereby conducting a reaction and distilling off a part of the solvent. As a result, disappearance of an isocyanate group was confirmed by IR spectroscopy, and 254.2 parts by mass of a methyl isobutyl ketone solution containing a radical-polymerizable resin (Y-3) in an amount of 50%. According to the results of the molecular weights of the radical-polymerizable resin (Y-3) determined by GPC (molecular weights determined on the polystyrene equivalent basis), the number-average molecular weight was 2,100, the weight-average molecular weight was 4,400, and the maximum molecular weight was 60,000.

Comparative Example 1

In a glass flask equipped with a stirrer, a thermometer, a condenser, and dropping devices, 69 parts by mass of methyl isobutyl ketone serving as a solvent was charged, and the temperature was increased to 105° C. while stirring in a nitrogen flow. Subsequently, two types of dropping liquids, namely, 137.8 parts by mass of a monomer solution prepared by mixing 40 parts by mass of a fluorinated alkyl group-containing acrylate:

[Chem. 9]

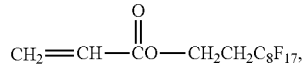

28.8 parts by mass of 2-hydroxyethyl methacrylate, and 69 parts by mass of methyl isobutyl ketone serving as a solvent, and 25.9 parts by mass of an initiator solution prepared by mixing 3.4 parts by mass of t-butylperoxy-2-ethylhexanoate serving as a radical polymerization initiator with 22.5 parts by mass of methyl isobutyl ketone serving as a solvent were separately set in the dropping devices, and added dropwise at the same time over a period of three hours while the temperature in the flask was maintained at 105° C. After the dropwise addition, stirring was conducted at 105° C. for 10 hours to obtain 232.7 parts by mass of a polymer solution.

Next, 0.1 parts by mass of p-methoxyphenol serving as a polymerization inhibitor, and 0.05 parts by mass of dibutyltin dilaurate serving as a urethanization catalyst were charged, and 31.2 parts by mass of 2-acryloyloxyethyl isocyanate was added dropwise over a period of one hour while a temperature of 60° C. was maintained in an air flow. After the dropwise addition, stirring was conducted at 60° C. for one hour, and the temperature was then increased to 80° C. and stirring was conducted for 10 hours, thereby conducting a reaction. As a result, disappearance of an isocyanate group was confirmed by IR spectroscopy. Subsequently, a part of the solvent was distilled off under reduced pressure to obtain 203.4 parts by mass of a methyl isobutyl ketone solution containing a radical-polymerizable resin (Z-1) in an amount of 50 mass percent. According to the results of the molecular weights of the radical-polymerizable resin (Z-1) determined by GPC (molecular weights determined on the polystyrene equivalent basis), the number-average molecular weight was 3,000, the weight-average molecular weight was 7,000, and the maximum molecular weight was 40,000.

Examples 4 to 6 and Comparative Examples 2 and 3

As an ultraviolet-curable coating composition, 50 parts by mass of pentafunctional non-yellowing urethane acrylate, 50 parts by mass of dipentaerythritol hexaacrylate, 25 parts by mass of butyl acetate, 5 parts by mass of 1-hydroxycyclohexyl phenyl ketone ("Irgacure 184" produced by Ciba Specialty Chemicals Inc.) serving as a photopolymerization initiator, and 54 parts by mass of toluene, 28 parts by mass of 2-propanol, 28 parts by mass of ethyl acetate, and 28 parts by mass of polypropylene glycol monomethyl ether which served as solvents were mixed and dissolved to obtain 268 parts by mass of the ultraviolet-curable coating composition.

To 268 parts by mass of the resulting ultraviolet-curable coating composition, 2 parts by mass of a solution containing 50 mass percent of each radical-polymerizable resin (fluorine-containing surfactant) was added and mixed. Each of the resulting ultraviolet-curable coating materials was applied onto a TAC film having a thickness of 80 μm using a bar coater No. 13. The films were then placed in a dryer at 60° C. for five minutes to volatilize the solvents, and cured with an ultraviolet curing device (in a nitrogen atmosphere, using a high-pressure mercury lamp, the amount of ultraviolet irradiation: 2 kJ/m$^2$) to prepare coating films. A coating film was also prepared in the same manner using the ultraviolet-curable coating composition to which no fluorine-containing surfactant was added.

A line was drawn on a coating surface of each of the resulting coating films with a felt pen (Magic Ink, large, blue, produced by Teranishi Chemical Industry Co., Ltd.). Stain-proof properties (a property of preventing adhesion of stains and a property of allowing stains to be easily wiped off) were evaluated by observing the adhesion state of the blue ink.

Furthermore, after the ultraviolet curing, the coating films were subjected to an immersion treatment in a strong alkali aqueous solution (2 mol/L KOH aqueous solution) at 70° C. for one minute, and then washed with pure water. The coating films were dried at 100° C. for three minutes, and then left to cool at room temperature. These coating films were also subjected to the evaluation of the stain-proof properties (the property of preventing adhesion of stains and the property of allowing stains to be easily wiped off) using the felt pen. The evaluation results of the coating films are shown in Table 1.

TABLE 1

| | Radical-polymerizable resin (Fluorine-containing surfactant) | Evaluation results of property of preventing adhesion of stains | | Evaluation results of property of allowing stains to be easily wiped off | |
|---|---|---|---|---|---|
| | | Film before strong alkali aqueous solution treatment | Film after strong alkali aqueous solution treatment | Film before strong alkali aqueous solution treatment | Film after strong alkali aqueous solution treatment |
| Example 4 | Y-1 | A | A | B | B |
| Example 5 | Y-2 | A | A | B | B |
| Example 6 | Y-3 | A | A | B | B |
| Comparative Example 2 | Not added | E | E | D | D |
| Comparative Example 3 | Z-1 | A | B | C | D |

<Criterion for Evaluation of Property of Preventing Adhesion of Stains>
A: The stain-proof property was the best, and the ink was repelled in the form of balls.
B: The ink was repelled not in the form of balls, but in the form of lines (the line width was less than 50% of the width of the tip of the felt pen).
D: The ink was repelled in the form of lines, and the line width was 50% or more and less than 100% of the width of the tip of the felt pen.
E: The ink was not repelled, and a line could be sharply drawn on the surface.

<Criterion for Evaluation of Property of Allowing Stains to be Easily Wiped Off>
After the test of "the property of preventing adhesion of stains", a wiping operation was performed using a load of 1 kg. The appearance of each of the coating films was evaluated by the criterion below.
B: The ink could be completely removed after the wiping operation was performed once.
C: The ink could be completely removed after the wiping operation was performed twice to ten times.
D: The ink could not be completely removed even after the wiping operation was performed ten times.

BRIEF DESCRIPTION OF DRAWINGS

FIG. 1 is an IR spectrum chart of a radical-polymerizable resin (Y-1) obtained in Example 1.
FIG. 2 is a $^{13}$C-NMR chart of the radical-polymerizable resin (Y-1) obtained in Example 1.
FIG. 3 is a $^{19}$F-NMR chart of the radical-polymerizable resin (Y-1) obtained in Example 1.

The invention claimed is:

1. An active-energy-ray-curable coating composition comprising:
as essential components, a radical-polymerizable resin (I) obtained by allowing a polymer (P1) obtained by copolymerizing, as essential monomer components, a compound (A) having a poly(perfluoroalkylene ether) chain and (meth)acryloyloxy groups at both ends of the chain with a monomer (B) having a (meth)acryloyl group and a functional group (b1) which is a hydroxyl group, an isocyanate group, a glycidyl group, or a carboxyl group, to react with a compound (C) having a (meth)acryloyl group and a functional group (c1) having reactivity with the functional group (b1), the functional group (c1) being a hydroxyl group, an isocyanate group, a glycidyl group, or a carboxyl group; and a polymerization initiator (II).

2. The active-energy-ray-curable coating composition according to claim 1, wherein the functional group (b1) contained in the monomer (B) is a hydroxyl group and the functional group (c1) contained in the compound (C) is an isocyanate group.

3. The active-energy-ray-curable coating composition according to any one of claims 1 and 2, wherein the radical-polymerizable resin (I) has a number-average molecular weight (Mn) in the range of 1,500 to 5,000 and a weight-average molecular weight (Mw) in the range of 4,000 to 50,000.

4. The active-energy-ray-curable coating composition according to claim 3, wherein the radical-polymerizable resin (I) contains fluorine atoms in a proportion of 2 to 25 mass percent therein.

5. The active-energy-ray-curable coating composition according to any one of claims 1 and 2, wherein the poly(perfluoroalkylene ether) chain contained in the resin structure of the radical-polymerizable resin (I) contains 25 to 80 fluorine atoms per chain.

6. The active-energy-ray-curable coating composition according to any one of claims 1 and 2, wherein the content of a radical-polymerizable unsaturated group in the radical-polymerizable resin (I) is in a proportion of 250 to 500 g/eq. as radical-polymerizable unsaturated group equivalent.

7. The active-energy-ray-curable coating composition according to any one of claims 1 and 2 further comprising:
another active-energy-ray-curable resin (III) or an active-energy-ray-curable monomer (IV) in addition to the radical-polymerizable resin (I) and the polymerization initiator (II).

8. The active-energy-ray-curable coating composition according to any one of claims 1 and 2, wherein the radical-polymerizable resin (I) is used as a fluorine-containing surfactant or a fluorine-containing surface modifier.

9. A cured product obtained by applying the active-energy-ray-curable coating composition according to any one of claims 1 and 2 onto a base, and curing the coating composition by irradiation of active energy rays.

10. A novel curable resin comprising:
a radical-polymerizable resin obtained by allowing a polymer (P1) obtained by copolymerizing, as essential monomer components, a compound (A) having a poly(perfluoroalkylene ether) chain and (meth)acryloyloxy groups at both ends of the chain with a monomer (B) having a (meth)acryloyl group and a functional group (b1) which is a hydroxyl group, an isocyanate group, a glycidyl group, or a carboxyl group to react with a compound (C) having a (meth)acryloyl group and a functional group (c1) having reactivity with the functional group (b1), the functional group (c1) being a hydroxyl group, an isocyanate group, a glycidyl group, or a carboxyl group.

* * * * *